(12) United States Patent
Herlin et al.

(10) Patent No.: US 10,788,609 B2
(45) Date of Patent: Sep. 29, 2020

(54) VEHICLE LIGHTING AND/OR SIGNALLING DEVICE

(71) Applicant: MARELLI AUTOMOTIVE LIGHTING ITALY S.P.A., Turin (IT)

(72) Inventors: Jean-Pascal Herlin, Turin (IT); Maria Chiara Frijia, Turin (IT)

(73) Assignee: MARELLI AUTOMOTIVE LIGHTING ITALY S.P.A., Turin (IT)

( * ) Notice: Subject to any disclaimer, the term of this patent is extended or adjusted under 35 U.S.C. 154(b) by 0 days.

(21) Appl. No.: 16/562,674

(22) Filed: Sep. 6, 2019

(65) Prior Publication Data
US 2020/0081171 A1    Mar. 12, 2020

(30) Foreign Application Priority Data

Sep. 7, 2018 (EP) .................................. 18425074

(51) Int. Cl.
*F21S 43/14* (2018.01)
*G02B 5/32* (2006.01)
(Continued)

(52) U.S. Cl.
CPC .............. *G02B 5/32* (2013.01); *F21S 41/143* (2018.01); *F21S 43/14* (2018.01); *F21S 43/235* (2018.01);
(Continued)

(58) Field of Classification Search
CPC .......... G02B 5/32; G02B 5/00; G02B 6/0011; G02B 6/0013; G02B 6/42; G02B 6/0023;
(Continued)

(56) References Cited

U.S. PATENT DOCUMENTS 5,128,848 A * 7/1992 Enders ............. F21S 8/043 362/268
5,839,813 A   11/1998 Smith
(Continued)

FOREIGN PATENT DOCUMENTS

GB    2321300 A      7/1998
WO    2008080996 A1  7/2008

OTHER PUBLICATIONS

European Search Report for European Patent Application No. 18425074 dated Feb. 19, 2019.

*Primary Examiner* — Bao Q Truong
(74) *Attorney, Agent, or Firm* — Howard & Howard Attorneys PLLC (57) ABSTRACT

A lighting and/or signaling device comprising a light guide which extends from a light input and diffusion wall to a light output wall that realizes a lighting portion, at least one LED light source, suitable to emit a light beam and facing a light input portion of said light input and diffusion wall. The lighting portion includes a central lighting portion and a peripheral lighting portion, surrounding the central lighting portion, the light guide being provided with extraction elements arranged on the light input and diffusion wall. A hologram is arranged between the LED light source and the light input portion so as to distribute according to a predefined pattern the light rays emitted by the LED light source and obtain a predefined luminance on the central lighting portion and the peripheral lighting portion.

31 Claims, 10 Drawing Sheets

(51) Int. Cl.
*F21S 41/143* (2018.01)
*F21S 43/235* (2018.01)
*F21W 102/20* (2018.01)
*F21Y 115/10* (2016.01)
*F21W 107/10* (2018.01)
*F21W 102/10* (2018.01)

(52) U.S. Cl.
CPC ..... *F21W 2102/10* (2018.01); *F21W 2102/20* (2018.01); *F21W 2107/10* (2018.01); *F21Y 2115/10* (2016.08)

(58) Field of Classification Search
CPC .. G02B 6/0035; G02B 6/0036; G02B 6/0038; F21S 43/14; F21S 41/143; F21S 43/235; F21S 43/236; F21S 43/239; F21S 43/247; F21S 43/249; F21Y 2115/10; F21W 2102/10; F21W 2102/20; F21W 2107/10; F21V 2200/00; F21V 2200/20
See application file for complete search history.

(56) References Cited

U.S. PATENT DOCUMENTS

| | | | |
|---|---|---|---|
| 9,377,183 B2* | 6/2016 | Holman | H01G 9/004 |
| 2008/0068852 A1 | 3/2008 | Goihl | |
| 2012/0033445 A1* | 2/2012 | Desmet | G02B 6/0038 |
| | | | 362/606 |
| 2013/0286653 A1* | 10/2013 | Holman | F21V 5/02 |
| | | | 362/293 |
| 2014/0226361 A1 | 8/2014 | Vasylyev | |
| 2014/0268872 A1* | 9/2014 | Holman | G02B 6/0083 |
| | | | 362/608 |

* cited by examiner

VEHICLE LIGHTING AND/OR SIGNALLING DEVICE

CROSS-REFERENCE TO RELATED APPLICATIONS

The present application claims priority to and all the benefits of European Patent Application No. 18425074.4, filed on Sep. 7, 2018, which is hereby expressly incorporated herein by reference in its entirety.

BACKGROUND OF THE INVENTION

1. Field of the Invention

The present invention relates to a vehicle lighting and/or signaling device.

2. Description of the Related Art

The term vehicle lighting and/or signaling device is used herein in a very broad sense so as to comprise a vehicle light, both rear and front, the latter also called a headlamp, or headlight.

This therefore comprises a sidelight, an indicator light, a brake light, a rear fog light, a reverse light, a dipped beam headlight, a main beam headlight and the like.

In addition, the term is also intended to mean a courtesy light, dashboard or part of it; therefore, the vehicle lighting and/or signaling device may be placed both internally and externally to the vehicle.

As is known, said vehicle lighting and/or signaling devices can be used both to illuminate and to send visual signals.

For these purposes, said devices comprise a plurality of lighting portions having different colours and different levels of luminance, also according to the regulations to be complied with and the like. Nevertheless, the vehicle headlamp is increasingly a distinctive element of the car and, consequently, its aesthetics are particularly important. In the case in point, there is an increasing need to make vehicle lighting and/or signaling devices that ensure a high uniformity of the lighting portions in order to satisfy both aesthetic and functional requirements.

In this regard, solutions with O-LEDs exist in the art that guarantee a high uniformity of the lighting portions; however, these solutions are very expensive and still have limitations in terms of life cycle and diagnostics in case of failure.

SUMMARY OF THE INVENTION

Such latter limitation is not negligible given that the need is increasingly felt in the art to use the vehicle light not only as an instrument to satisfy type-approval requirements in order to obtain light beams that satisfy specific photometric requirements but also as a design instrument specific to the vehicle on which the light is used.

As a result, the light pattern emitted by the headlight does not only have the function of fulfilling the signaling and/or lighting function but also that of creating a precise, desired light effect.

In addition, the lighting and/or signaling device may also be used in order to send light signals such as texts, graphic symbols, as well as to produce light animations made by precise activation sequences of lighting portions.

The need is therefore felt in the art to make available a low-cost vehicle lighting and/or signaling device, more efficient than the O-LEDs, and able to guarantee a high homogeneity of lighting, comparable to that obtainable with O-LEDs, without presenting the drawbacks of O-LED technology.

This requirement is met by a vehicle lighting and/or signaling device comprising a light guide back-lit by LED light sources and able to provide a lighting surface without light spots/areas of shade. To this end, a lighting and/or signaling device of the present invention includes a light guide which extends from a light input and diffusion wall suitable to receive and diffuse a light beam to a light output wall that realizes a lighting portion of the lighting and/or signaling device, at least one LED light source, suitable to emit a light beam along a main optical axis and facing a light input portion of the light input and diffusion wall suitable to receive the light beam emitted by said LED light source. The input and diffusion wall and the light output wall are opposite each other along the main optical axis. The lighting portion includes a central lighting portion, aligned with the LED light source and the light input portion, and a peripheral lighting portion, surrounding the central lighting portion. The light guide includes extraction elements suitable to extract light from the light guide. A hologram is arranged between the LED light source and the light input portion that distributes according to a predefined pattern the light rays emitted by the LED light source and so as to obtain a predefined luminance on both the central lighting portion and the peripheral lighting portion.

BRIEF DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION OF THE INVENTION

With reference to the aforementioned figures, reference numeral 4 globally denotes a lighting and/or signaling device, such as a vehicle light, which the description below refers to without by so doing detracting from its general application.

As mentioned above, the term lighting and/or signaling device is understood to mean indifferently a rear vehicle light or a front vehicle light, the latter also known as a headlight or headlamp, comprising at least one light on the outside of the vehicle having a lighting and/or signaling function, such as for example a position light, which may be a front, back, side position light, a direction indicator light, a brake light, a rear fog light, a reversing light, a low beam headlight, a high beam headlight, and the like.

In addition, the term lighting and/or signaling device also refers to an interior courtesy light, a dashboard or part of it, a display and so forth.

Consequently, as better described below, in its signaling function the device may comprise the possibility of sending luminous signals, logos, but also written and luminous messages of any kind.

The lighting and/or signaling device 4 comprises a container body or housing 8, usually of polymeric material, which generally allows the attachment of the lighting and/or signaling 4 device to the relative vehicle.

For the purposes of the present invention, the container body or housing 8 may be any shape, size and assume any position: for example, the container body 8 need not be directly joined to the body or other fixtures of the vehicle.

As shown, the container body 8 may also be connected internally to the vehicle, e.g. on the instrument panel, dashboard, parcel shelf and so forth.

The container body 8 delimits a containment seat 12 that houses a plurality of components of said lighting and/or signaling device and in particular LED light sources 16.

The LED light source 16 emits a light beam that is diffused along a main optical axis X-X.

In other words, the LED light source 16 emits a light beam comprising a plurality of light rays arranged around, preferably axially, a main optical axis X-X.

The container body 8 is connected to a lenticular body 20 so as to close said containment seat 12 housing at least one LED light source 16.

For the purposes of the present invention the lenticular body 20 may be external to the vehicle lighting and or signaling device 4, so as to define at least one outer wall of the vehicle lighting and or signaling device directly subject to the atmosphere.

The lenticular body 20 closes the containment seat 12 and is suitable to be crossed by the beam of light produced by the LED light source 16 which is transmitted to the outside of the containment seat 12.

To this end, the lenticular body 20 is made of at least partially transparent or semi-transparent or translucent material, and may also comprise one or more opaque portions, so as to allow in any case the at least partial crossing of the light beam produced by the light source.

According to possible embodiments, the material of the lenticular body 20 is a resin such as PMMA, PC and the like.

A mask (not illustrated) may also be applied to the lenticular body 20 to appropriately delimit light emitting portions of the lighting and/or signaling device 4.

The lighting and/or signaling device 4 comprises a light guide 24 located in said containment seat 12 defined by the container body 8 closed by the lenticular body 20. Such light guide 24 extends from a light input and diffusion wall 28 suitable to receive a light beam to a light output wall 32 that realizes a lighting portion 36 of the device 4.

The input and diffusion wall 28 and the light output wall 32 are opposite each other along the main optical axis X-X.

The LED light source 16 is facing a light input portion 40, called incoupling in the technical jargon, of the light input and diffusion wall 28. The light emitted by the LED source 16 can thus penetrate inside the light guide 24, through said light-input portion 40, to be transmitted by total internal reflection between the light-input and diffusion wall 28 and the light-output wall 32.

The lighting portion 36 comprises a central lighting portion 44, aligned with the LED light source 16 and the light input portion 40, and a peripheral lighting portion 48, surrounding said central lighting portion 44. Preferably, the lighting portion 36 is axially symmetrical to the main optical axis X-X of the LED light source 16.

The light guide 24 is provided with extraction elements 52 arranged on the light input and diffusion wall 28, with the exception of the light input portion 40, at said peripheral lighting portion 48.

According to one embodiment, the extraction elements 52 are micro-optics that directly or indirectly diffuse light to the light output wall 32.

For example, the extraction elements 52 may comprise point-shaped micro-optics and/or concentric grooves; the micro-optics may also have a conical or truncated-conical shape.

Preferably, the extraction elements 52 are arranged according to a non-homogeneous pattern having a density that increases as the distance from the corresponding LED light source 16 increases in a radial direction R-R contained in a plane perpendicular to the main optical axis X-X and incident therewith. Density increase refers to the distance between consecutive extraction elements 52 that gradually decreases on the light input and diffusion wall 28.

In addition, preferably, as the distance from the corresponding LED light source 16 increases in a radial direction R-R, the depth of the extraction elements 52 also increases, e.g., in the form of concentric or micro-optical conical or truncated grooves, on the light input and diffusion wall 28.

In addition, the lighting and/or signaling device 4 comprises at least one reflector element 54 associated with the light input and diffusion wall 28 of the light guide 24 and directly facing the respective extraction elements 52 so as to reflect the light towards the light output wall 32. More specifically, the extraction elements 52 may be structured to direct light towards the reflector element 54, so that this may reflect light towards the light output wall 32 in a more homogeneous manner. Or, in an embodiment variant, the extraction elements 52 may be structured to direct the light directly towards the light output wall 32, with the reflector element 54 arranged for the recovery of light lost by the extraction elements 52 in the opposite direction.

Figure 1:
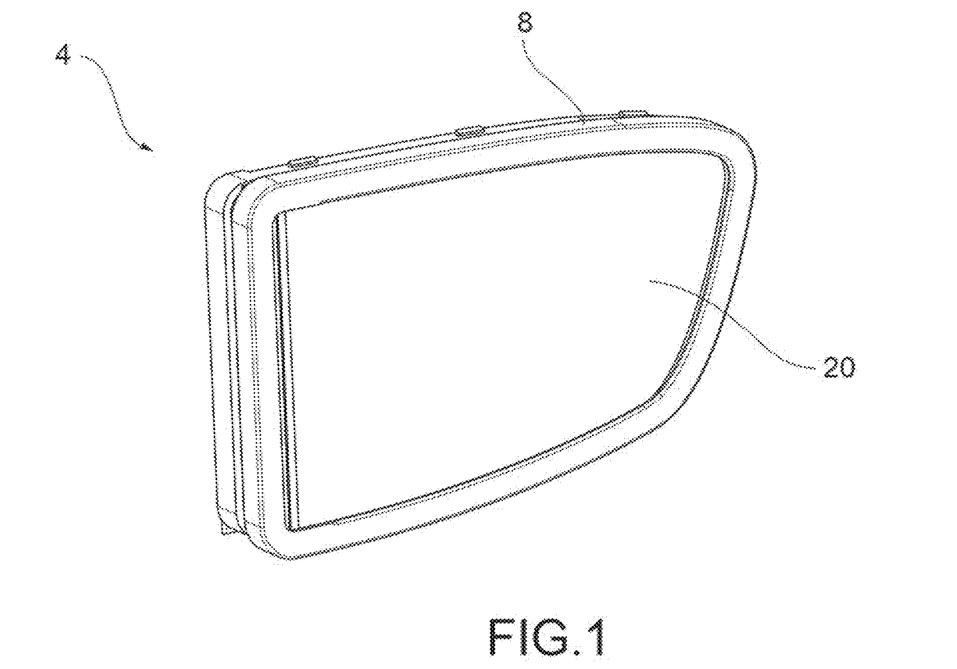
FIG. 1 shows a perspective view, in an assembled configuration, of a lighting and/or signaling device according to one embodiment of the present invention.
Figure 2:
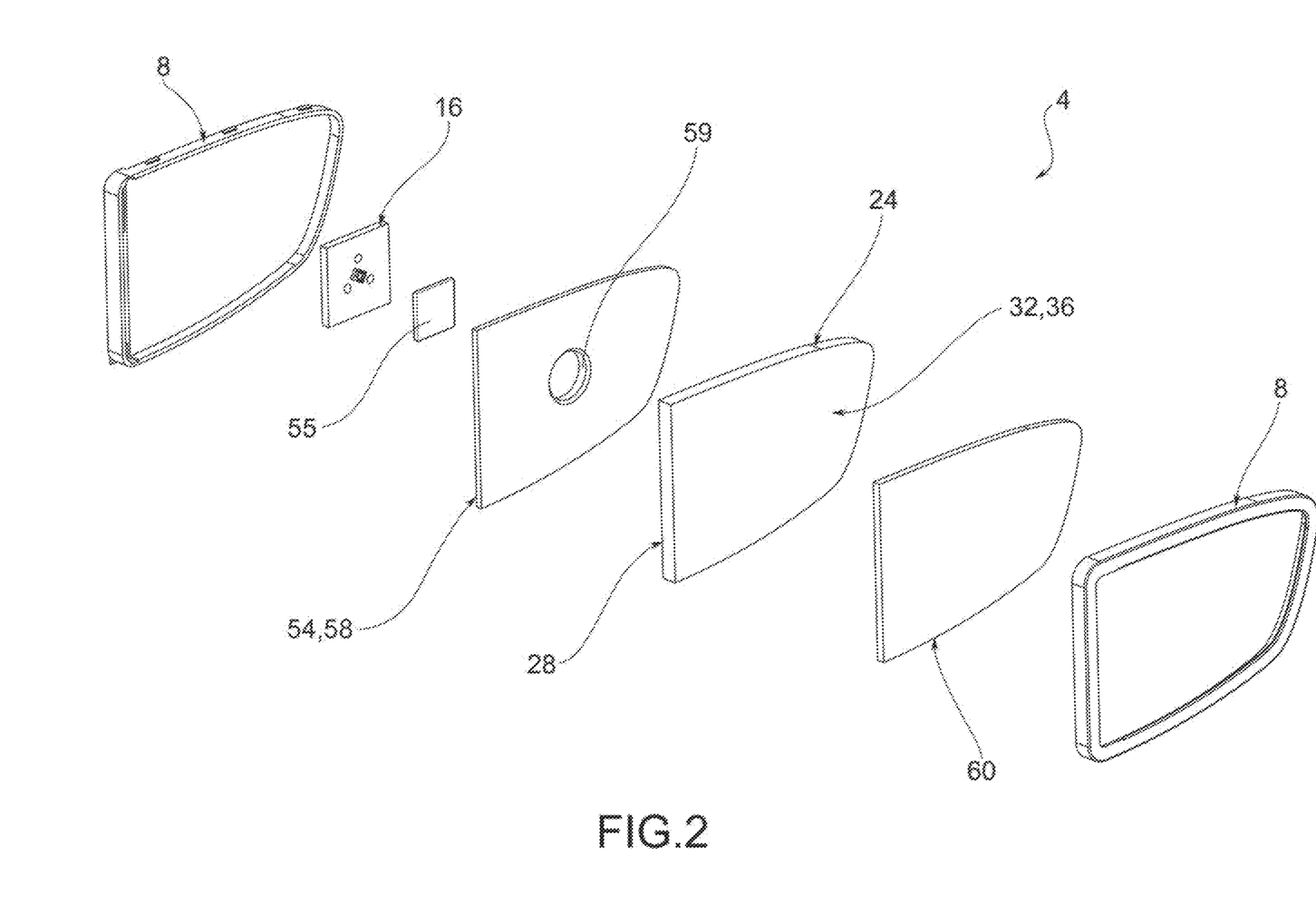
FIG. 2 shows a perspective view in separate parts of the lighting and/or signaling device in FIG. 1.
Figure 3:
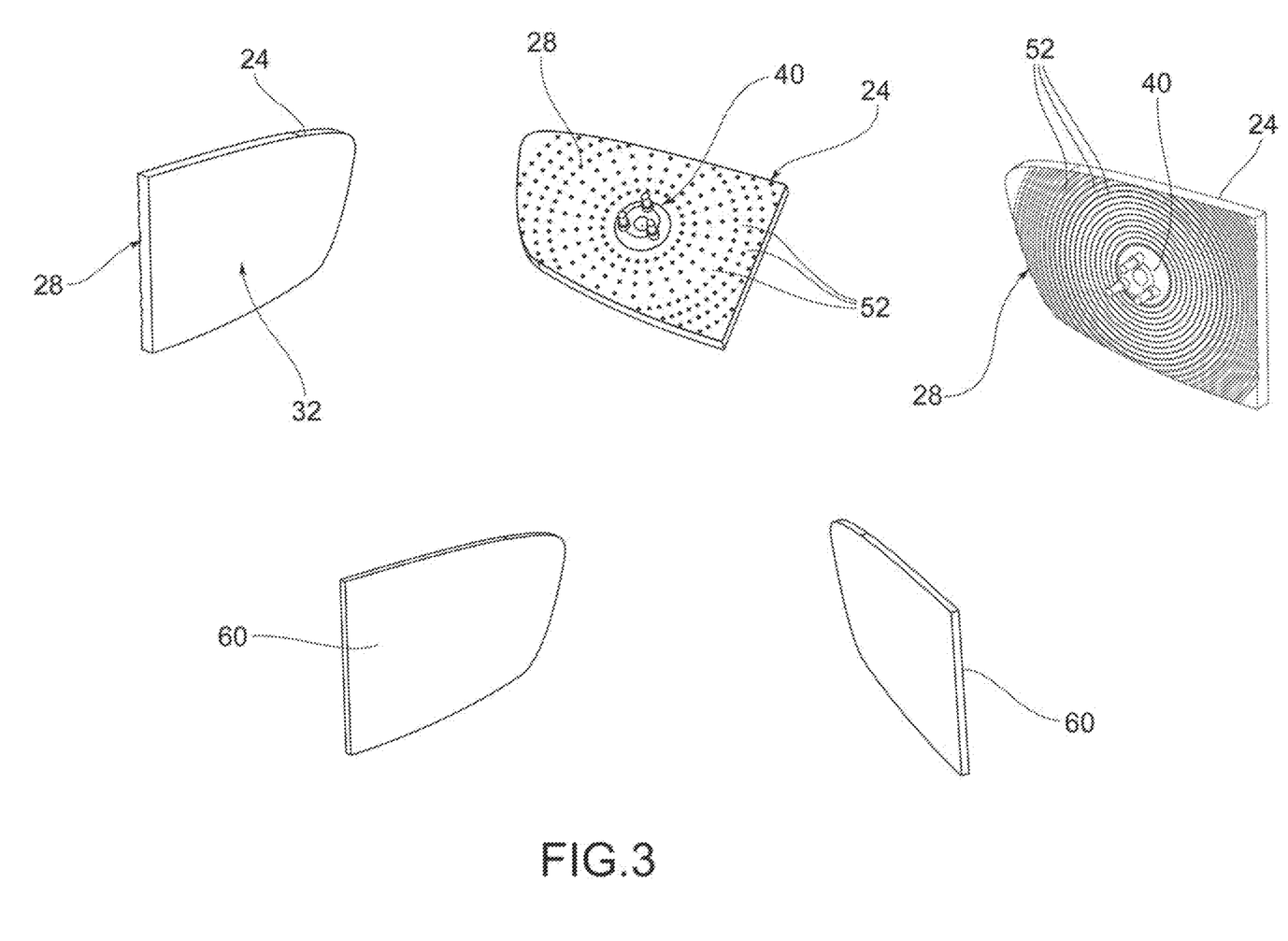
FIG. 3 show perspective views of some components of the lighting and/or signaling device in FIG. 1.
Figure 4:
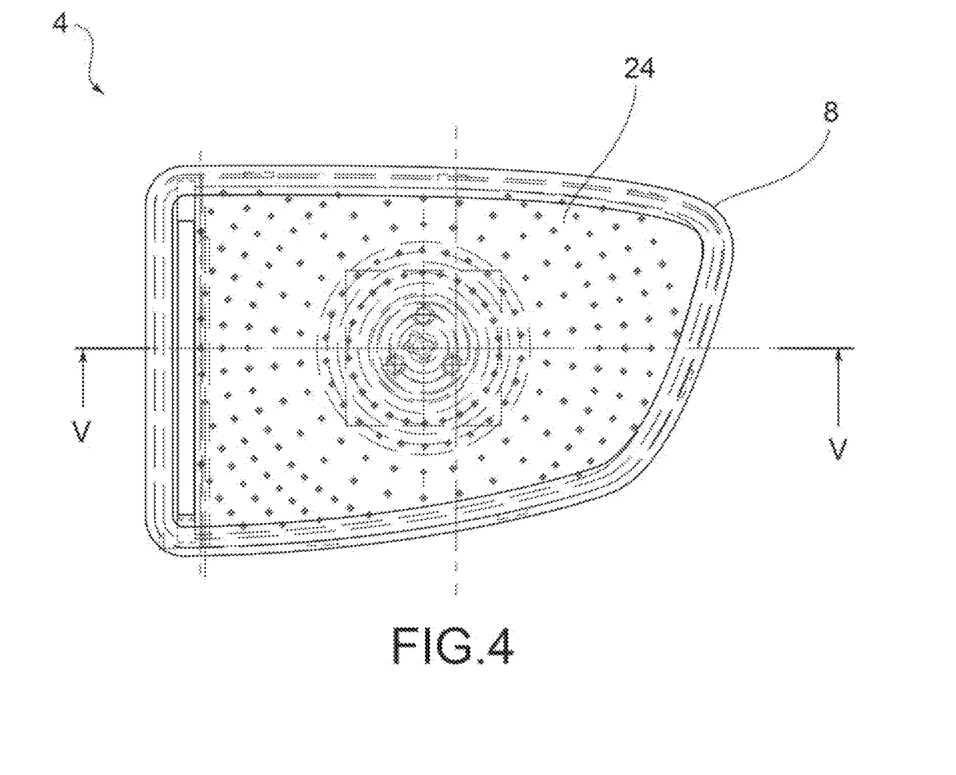
FIG. 4 shows a front view, in an assembled configuration, of the lighting and/or signaling device in FIG. 1.
Figure 5:
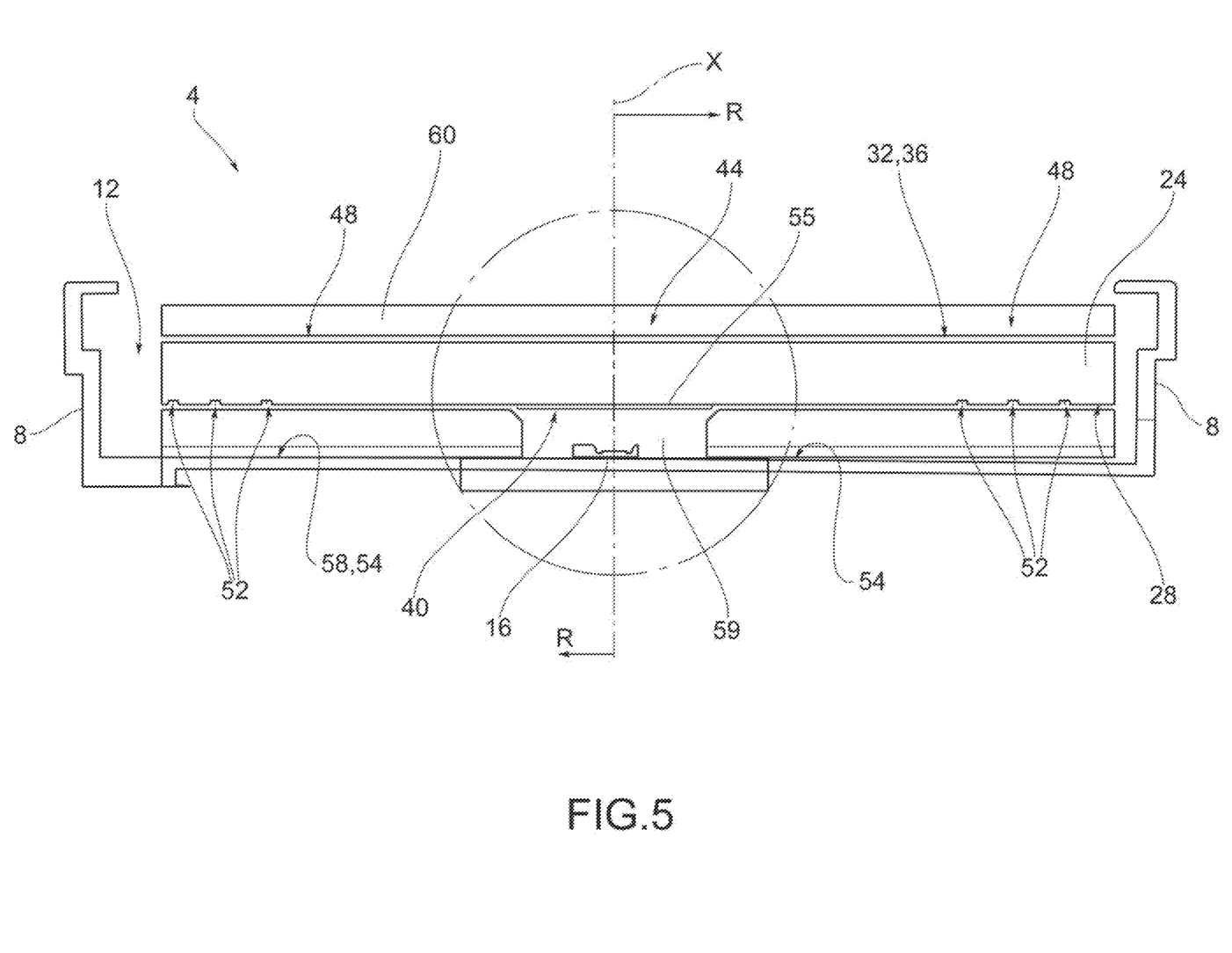
FIG. 5 shows a cross-section view of the lighting and/or signaling device in FIG. 1, along the cross-section plane V-VI shown in FIG. 4.
Figures 6A, 6B, 6C, 6D, 6E:
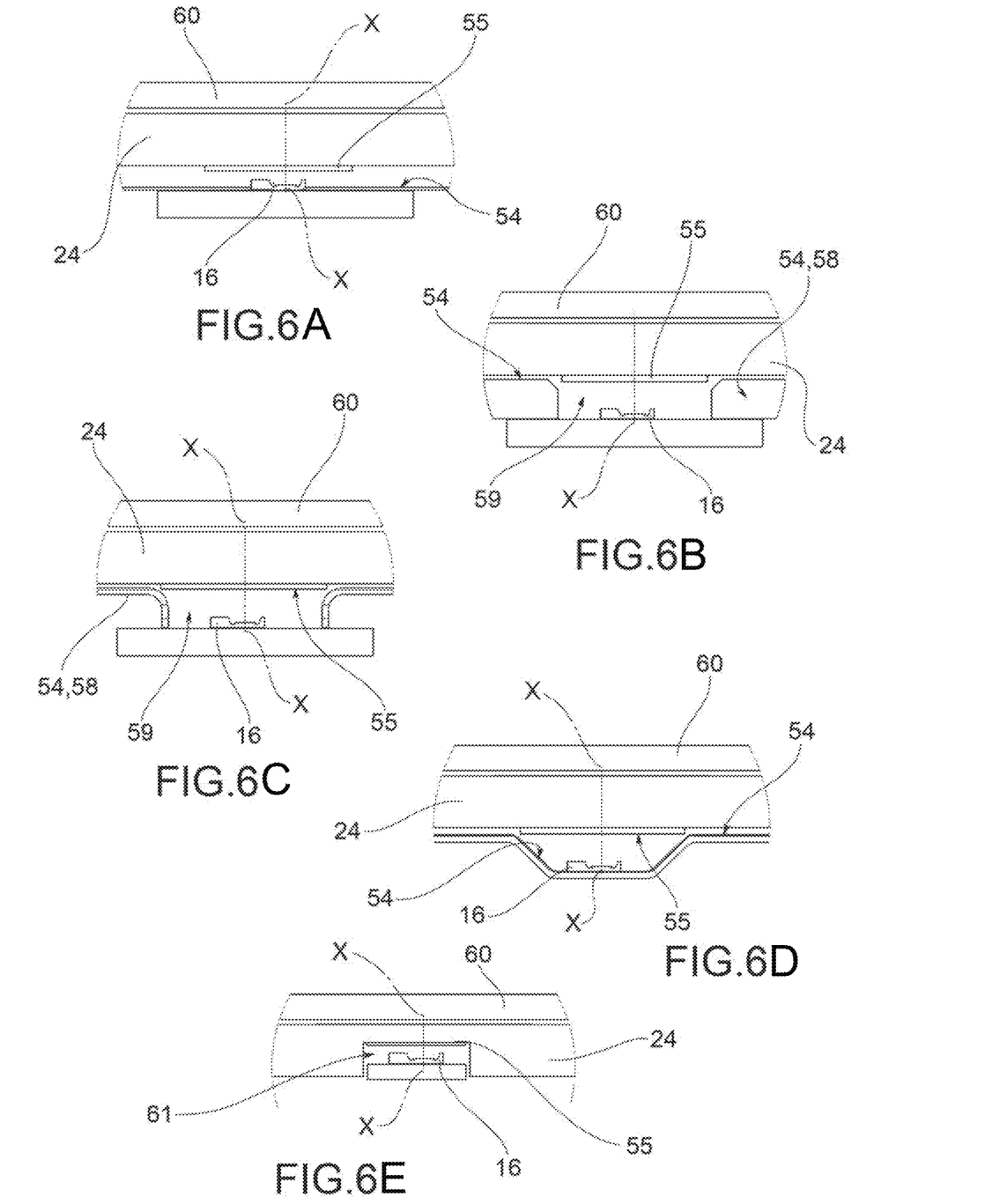
FIGS. 6A-6E are cross-sectional views of parts of a lighting and/or signaling device according to different embodiments of the present invention.
Figure 7:
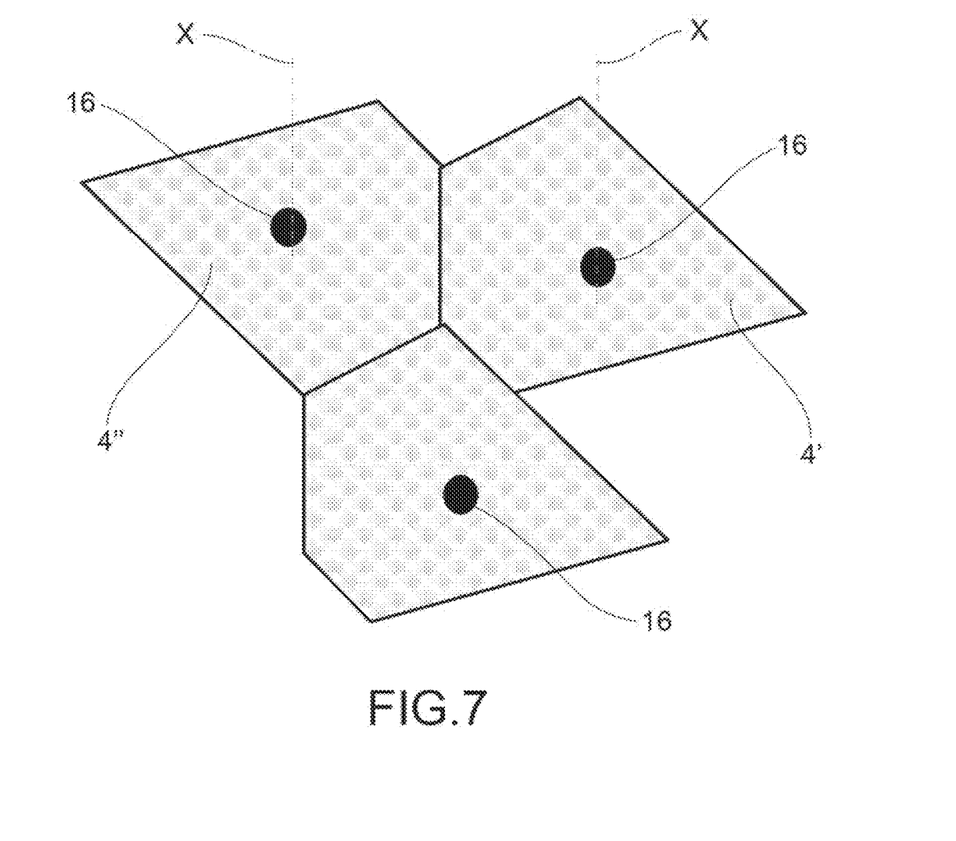
FIG. 7 shows a plan view of a lighting and/or signaling module according to one embodiment of the present invention.
Figure 8:
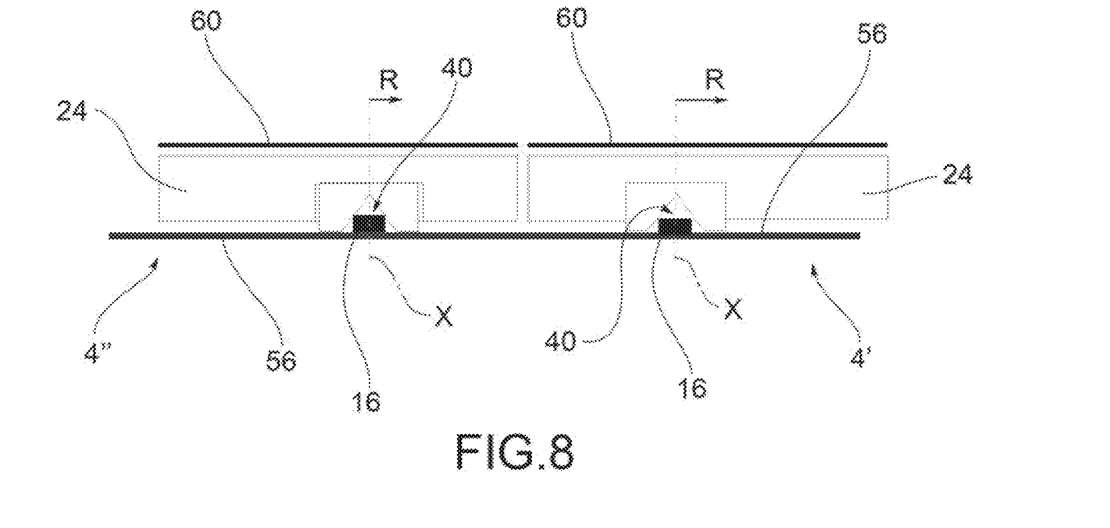
FIG. 8 shows a cross-section view of the module in FIG. 7.
Figures 9, 10:
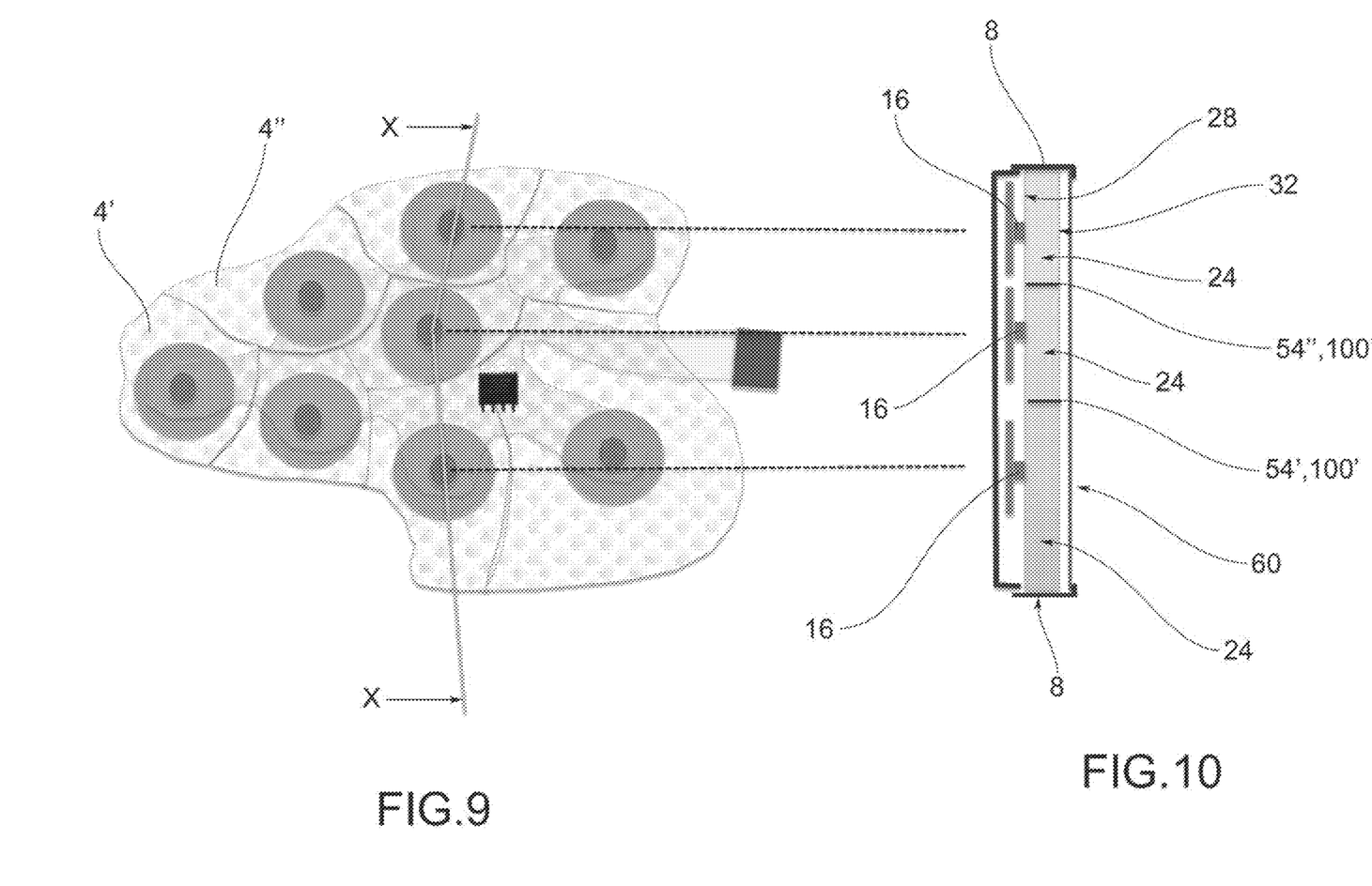
FIG. 9 shows a plan view of a lighting and/or signaling module according to a further embodiment of the present invention.
FIG. 10 is a cross-section view of the module in FIG. 9, along the cross-section plane X-X indicated in FIG. 9.
Figure 11:
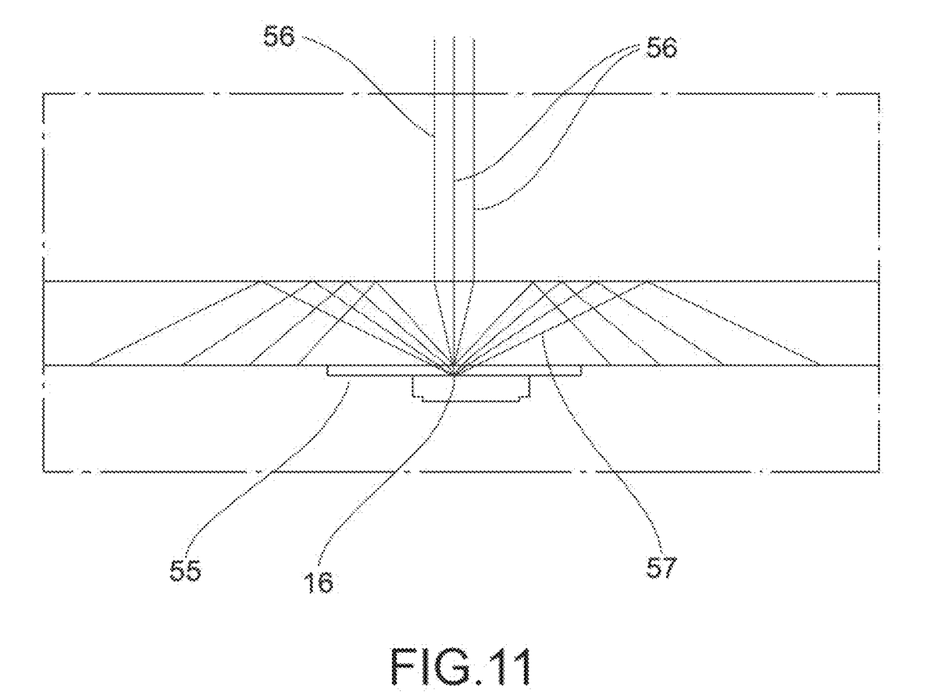
FIG. 11 shows a schematic view of the flow of light beams influenced by a lighting device according to the present invention.
Figure 12:
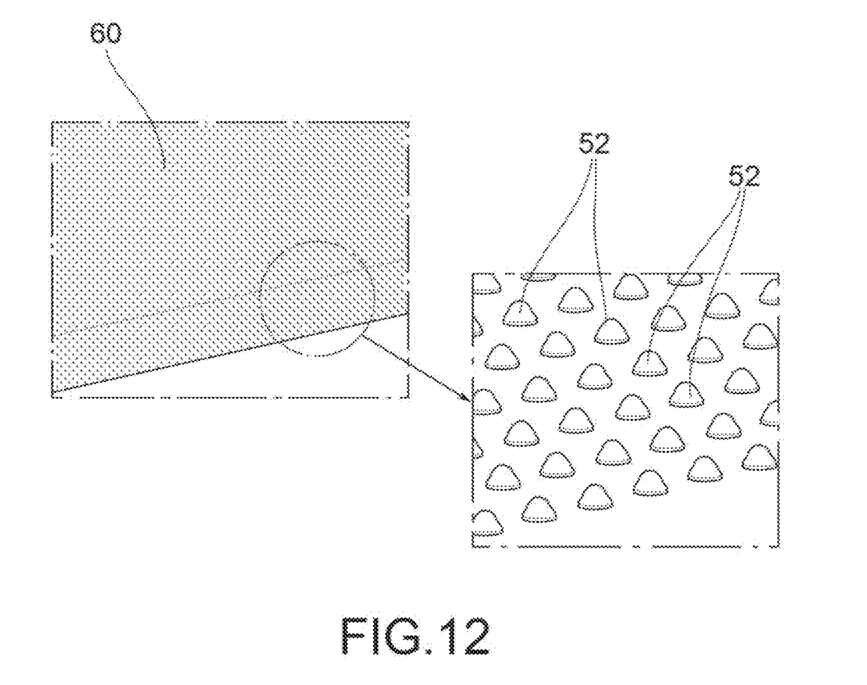
FIG. 12 shows a partial enlarged view of a lighting and/or signaling device provided with a diffusion layer with micro-optics according to a possible embodiment of the present invention.
Figure 13:
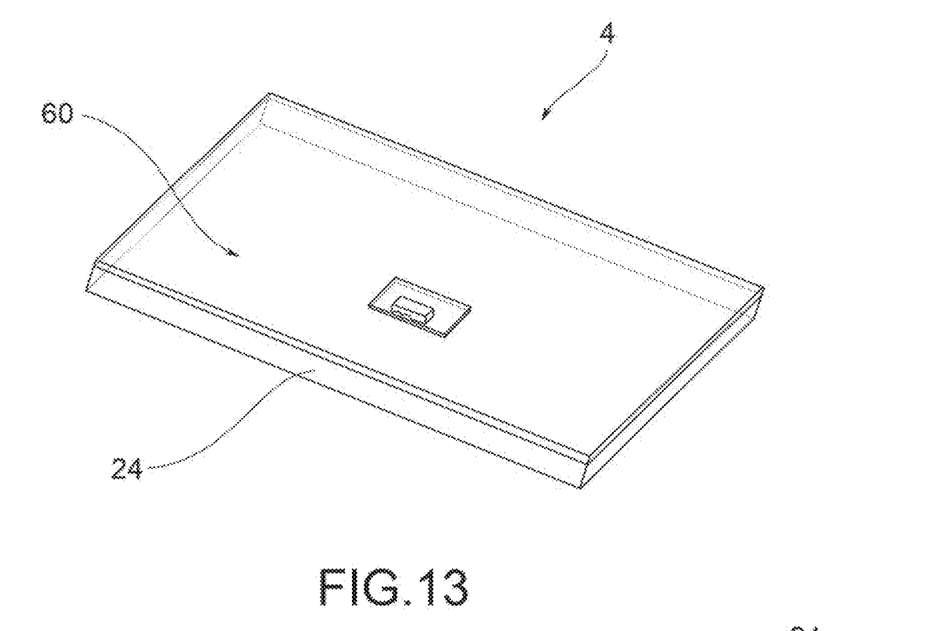
FIG. 13 shows an overall perspective view of the lighting and/or signaling device in FIG. 12.
Figure 14:
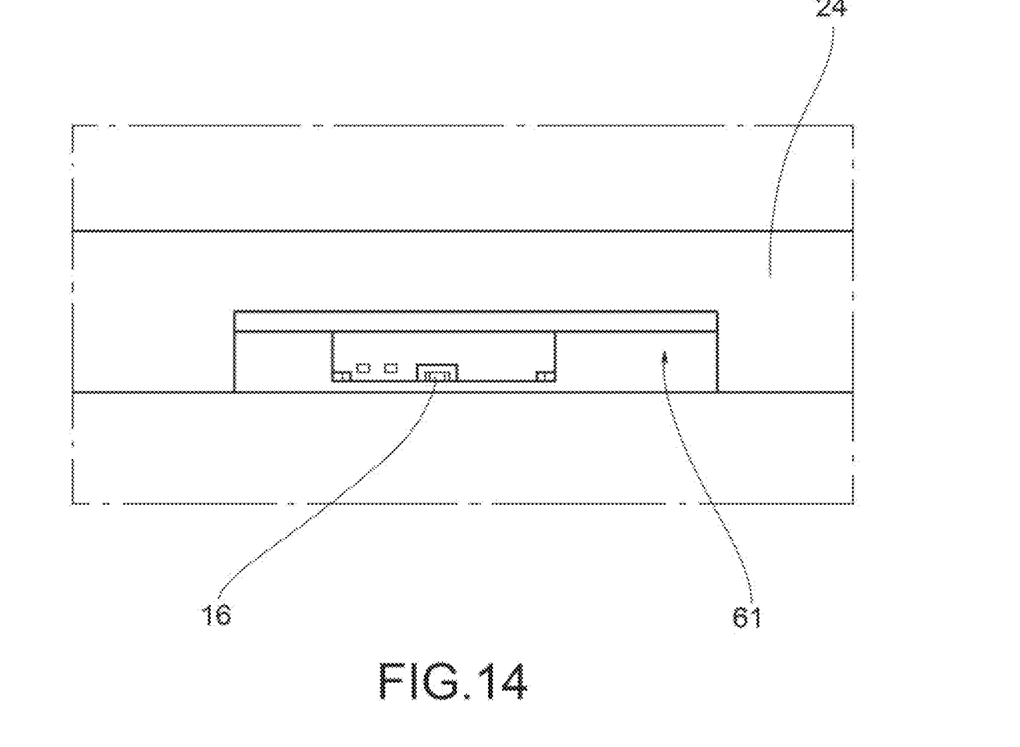
FIG. 14 shows a cross-section view of the lighting and/or signaling device in FIG. 13.

According to possible embodiments, the reflector element 54 is a white film (FIGS. 6A, 6C, 6D) or a mirror (FIG. 6B) reflecting the light coming from the light input and diffusion wall 28 of the light guide 24.

The reflector element 54 may be located at a predefined distance from the light input and diffusion wall 28, so as to form a gap between the two elements. This arrangement could improve the mixing of the light reflected by the reflector element 54. However, this gap could be reduced as much as possible, until it is cancelled, so as to reduce a thickness of the lighting and/or signaling device 4, i.e. the distance between the light input and output walls 28, 32.

Advantageously, a hologram 55 is arranged between the LED light source 16 and the light input portion 40 distributes, according to a predefined pattern, the light rays emitted by the LED light source 16 and obtain a predefined luminance on both the central lighting portion 44 and the peripheral lighting portion 48.

According to one embodiment, the hologram 55 evenly distributes on the light guide 24 the light rays emitted by the LED light source 16 and obtain a uniform luminance on both the central lighting portion 44 and the peripheral lighting portion 48.

In particular, according to a possible embodiment, the hologram 55 allows the direct transmission of a first portion 56 of the light beams through the light guide 24 by diverting said first portion 56 of the light beams with an angle below the limit angle of the light guide material 24, and so as to send a second portion 57 of the light beams in the light guide 24 with an angle above the limit angle of the light guide material 24. For example, in the case of a light guide 24 made of PMMA (polymethylmethacrylate) said limit angle is about 40 degrees.

In this way, the first portion 56 of the light beams produced by the LED light source 16 directly crosses the light guide 24, coming out from the light output wall 32, while the second portion 57 of the light beams enters the light guide 24 and is reflected thereby by total internal reflection, to then be extracted by the extraction elements 52 and by the reflector element 54.

According to a possible embodiment, the first portion 56 of the light beams comprises 45%-55% of the light beams produced by the LED light source.

Preferably, the hologram 55 is configured so that the first portion 56 of the deflected light beams is directly incident on said central lighting portion 44.

Figure 15A:
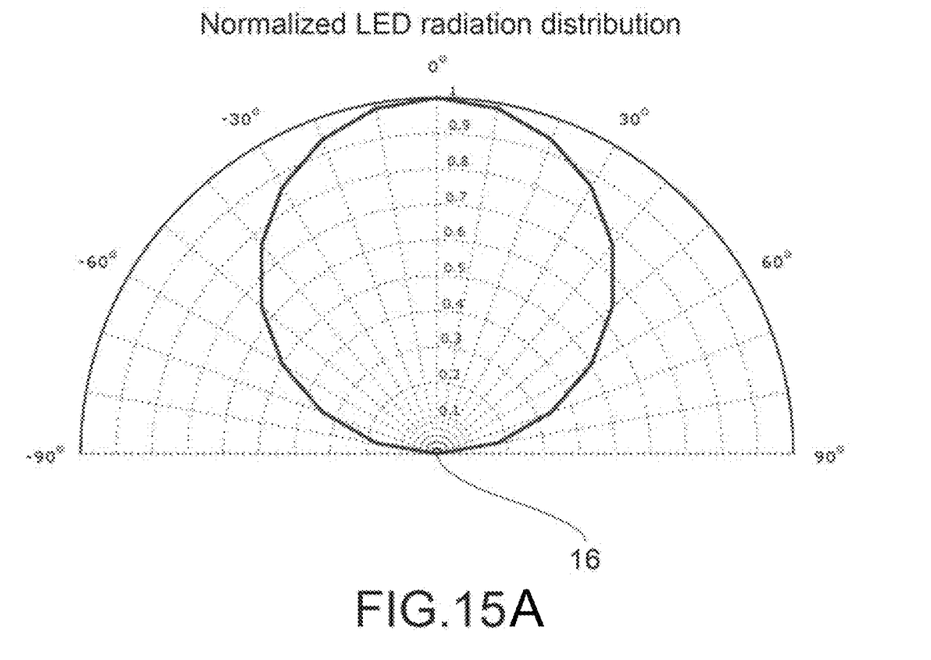
FIGS. 15A and 15B schematically represent two graphs of the distribution of the light beams of a LED light source without a hologram and with a hologram, respectively.
Figure 15B:
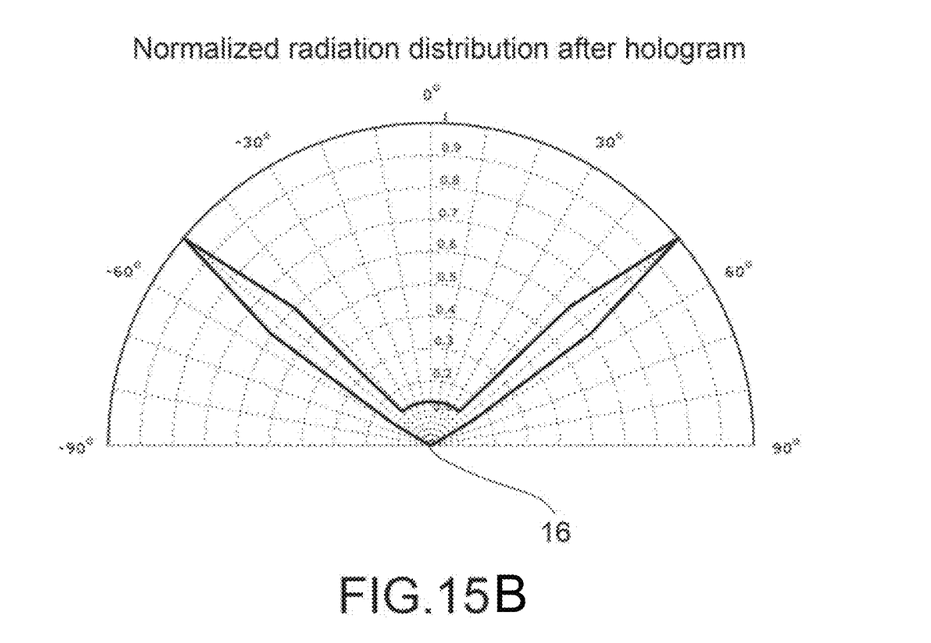

An example of a variation of the distribution of the light beams produced by the LED light source 16 obtainable by the interposition of a hologram 55 is inferable from the comparison of FIGS. 15A and 15B, respectively without and with a hologram.

According to one embodiment, the hologram 55 is configured so that said central lighting portion 44 receives only the first portion 56 of the deflected light beams. More specifically, about 47% of the luminous flow emitted by the LED light source 16 is within ±40°. This means that this percentage of the luminous flow affects the light output wall 32 with an angle of incidence below the limit angle and is thus transmitted directly outside by the light guide 24. Instead, the remaining 53% of the luminous flow emitted by the LED light source 16 affects the light output wall 32 with an angle of incidence greater than the limit angle and is thus reflected inside the light guide 24.

The hologram 55 preferably has an axial symmetrical configuration.

Preferably, the hologram 55 is axially symmetrical with respect to a main axis aligned with respect to the main optical axis X-X of light emission of the LED light source 16. In other words, the hologram 55 is preferably placed in front of the LED focus so as to be aligned with said focus. Both the light beam produced by the LED light source 16 and the hologram 55 are provided with a geometry having a circular symmetry, i.e. axially symmetrical.

The hologram 55 may be placed in contact with the light-emitting portion 40 of the light input and diffusion wall 28.

According to a possible embodiment, the reflector element 54 comprises a plate 58 facing the light input and diffusion wall 28, wherein said plate 58 is perforated and delimits a seat 59 housing said hologram 55.

According to one embodiment, said seat 59 houses at least partially the LED light source 16. This can further reduce the overall thickness of the lighting and/or signaling device 4 relative to the main optical axis X-X.

It is also possible to provide a pocket 61 on the light guide 24, on the side of the light input and diffusion wall 28 which can house at least partially the LED light source 16, in order to reduce the overall thickness of the lighting and/or signaling device 4. In this embodiment, the hologram may be laminated on an inner surface 62 of the pocket 61.

According to one embodiment, the seat 59 has a hollow shape, facing the hologram 55, so as to facilitate the conveyance of the light beams onto said hologram 55.

The plate 58 and/or the seat 59 are preferably coated with a film of reflective material, for example in the part facing the light guide 24.

According to one embodiment, a diffusion layer 60, opaline, embossed or screen-printed, is arranged on the side of the light output wall 32, covering the lighting portion 36, as better described below. Said diffusion layer 60 serves precisely to ensure the homogeneity of lighting of the lighting portion 36 as a whole, comprising both the central lighting portion 44 and the peripheral lighting portion 48. Said central and peripheral lighting portions 44, 48 must be homogeneous on the inside and also at their interfaces so as to have a homogeneous lighting portion 36 overall.

Advantageously, the diffusion layer 60 has a transmittance differentiated according to the luminous intensity of the incident light rays on the lighting portion 36, so as to obtain a uniform luminous intensity throughout said lighting portion 36.

In other words, the light output wall 32 includes transmittance variation portions, for example the diffusion layer 60, for selectively varying the transmittance of the light beam along said light output wall 32, so as to balance, level, uniform, homogenize the luminous intensity (luminance) of said central 44 and peripheral lighting portions 48 of the light output wall 32.

In particular, according to one embodiment, the diffusion layer 60 has a lower transmittance at the light rays with greater luminous intensity incident on the lighting portion and a greater transmittance at the light rays with lower luminous intensity incident on the lighting portion 36.

According to one embodiment, the diffusion layer 60 has less transmittance at the central lighting portion 44 and greater transmittance at the peripheral lighting portion 48.

According to a possible embodiment, the diffusion layer 60 comprises an opaline layer and the transmittance variation is obtained by a variation of the thickness S of the opaline layer with respect to a cross-section plane parallel to the main optical axis X-X of the LED light source 16.

According to an embodiment variant, the transmittance variation of the opaline layer can be obtained by varying the density and/or size of the scattering particles specific to the opaline material.

For example, the thickness S of the opaline layer is greater at the central lighting portion 44 and less at the peripheral lighting portion 48.

According to a further possible embodiment, the diffusion layer 60 comprises an embossed layer and the transmittance variation is obtained by a change in embossing density/roughness and/or thickness S of the embossed layer, relative to a cross-section plane parallel to the main optical axis X-X of the LED light source 16.

For example, the thickness S of the embossed layer and/or the density of the embossing is greater at the central lighting portion 44 and less at the peripheral lighting portion 48.

According to a further possible embodiment, the diffusion layer 60 may comprise a screen-printed layer and the transmittance variation may be obtained by different patterns or motifs.

For the purposes of the present invention, the light input portion 40, directly facing the LED light source 16, may assume specific geometries. Alternatively, or in addition to the above, it is possible to act on the extraction elements 52 of the light guide 24, in order to homogeneously extract the light from the lighting portion 36 of the light guide 24. In the solution with grooves, for example, action may be taken on the pitch or depth of said groove so as to compensate for the difference in luminance between the central lighting portion 44, affected by rays emitted directly by the hologram 55, and the peripheral lighting portion 48 in which light extraction takes place by the extraction elements 52. With regard to the solution with micro-cones, it is also possible to act in this circumstance on the pitch and depth of said micro-cones. In general, the geometry and/or pitch of the extraction elements 52 can be modified to ensure homogeneity of luminance between the central lighting portion 44 and the peripheral lighting portion 48.

In one embodiment, the electronic board supporting the LED light source 16 is a white colour, or has a coating similar to that of the film, or layer, of the reflector element 54.

The description above refers to a single signaling and/or lighting device 4; in actual fact, the device may in turn be obtained by juxtaposing a plurality of lighting and/or signaling devices, each lighted by a corresponding LED light source 16.

In other words, lighting and/or signaling modules 104 comprising a plurality of lighting and/or signaling devices 4', 4" may be made in which lighting portions 36', 36" of adjacent devices 4', 4" may be separated by barrier elements 100 opaque to the light rays of each light beam emitted by a corresponding LED light source 16', 16".

For example, the reflector elements 54 of the lighting and/or signaling devices also act as barrier elements 100 at lighting and/or signaling devices 4', 4" side by side and adjacent to each other.

According to possible embodiments, the barrier elements 100 comprise a film opaque to light and/or separator septums opaque to light.

It is also possible to provide that the barrier elements 100 are co-moulded with the reflector element 54.

It should also be noted that the shapes and dimensions of the light guides 24', 24" may be various; the number of light guides may be greater than two and the light guides 24', 24" may be arranged to form lighting portions 36', 36" having any shape and extension, as for example illustrated in FIGS. 7-10.

In this way it is possible to switch on different lighting portions, even in a large number (well beyond the two units) in order to create possible optical effects or also in order to create, with said lighting portions, the writing, logos, messages that may have additional functions compared to the accepted lighting function.

In this way the lighting device 4 also becomes an image forming device. To this end, it is possible to form and arrange the light guides 24 so as to have lighting portions arranged according to various geometric patterns: in this way it is possible to compose alphanumeric codes that therefore comprise both numbers and letters of the alphabet.

Obviously, an appropriate sequence of switching on the various lighting portions, thanks to the separate controls of the respective LED light sources, will make it possible to obtain specific graphic effects, written, but also animations of various types, according to the needs of the user.

The final technical effect, thanks to the adoption of the diffusion layer 60, is to further homogenize the light beams emitted by the lighting portions of the lighting and/or signaling device in order to obtain a homogeneity of lighting completely equivalent to that obtainable with an O-led type technology.

As may be appreciated from the description, the present invention makes it possible to overcome the drawbacks mentioned of the prior art.

In particular, the vehicle lighting and/or signaling device according to the present invention makes it possible to obtain any predefined luminous pattern provided with portions with any degree of luminance, capable of fulfilling all the photometric specifications of the headlight but also capable of emitting light signals, graphics of any type so as to become a communication tool of information as well as a light signaling and lighting device.

In addition, the lighting and/or signaling device according to the present invention allows any animation to be obtained by activation on command and according to a predetermined sequence, of the lighting portions of the light guides.

In addition, the various lighting portions have a level of homogeneity entirely comparable to those obtainable with O-led technology, while having a significantly lower complexity and cost than the latter technology.

In addition, the lighting and/or signaling devices of the present invention have an extremely small footprint so that they are suitable to be applied both inside and outside the vehicle; furthermore, their reduced thickness facilitates their arrangement in various positions since they do not require modification of the structure in which they are placed and do not require particularly deep housings.

The lighting and/or signaling devices of the present invention may be both planar and curved and therefore fit to be positioned at any point since they can easily be integrated into the curved lines of the bodywork and/or dashboard without any difficulty.

There are no limitations in terms of geometry or pattern or shape of the lighting portions obtainable.

The lighting patterns are also characterized by a remarkable uniformity and homogeneity of the light beam diffused outside the device.

Consequently, thanks to the present invention, it is possible to obtain a luminous pattern, or any lighting surface, or having any geometric shape, while maintaining a high energy efficiency and homogeneity of lighting of the pattern.

The solution is simple to achieve, with limited costs, weights and dimensions.

A person skilled in the art may make numerous modifications and variations to the lighting and/or signaling devices described above so as to satisfy contingent and specific requirements while remaining within the sphere of protection of the invention as defined by the following claims.

The invention claimed is:

1. A lighting and/or signalling device comprising:
   a light guide which extends from a light input and diffusion wall suitable to receive and diffuse a light beam to a light output wall that realizes a lighting portion of the lighting and/or signalling device,
   at least one LED light source, suitable to emit a light beam along a main optical axis and facing a light input portion of said light input and diffusion wall suitable to receive said light beam emitted by said LED light source,
   wherein the input and diffusion wall and the light output wall are opposite each other along the main optical axis,
   the lighting portion comprising a central lighting portion, aligned with the LED light source and said light input portion, and a peripheral lighting portion, surrounding said central lighting portion,
   the light guide being provided with extraction elements suitable to extract light from the light guide,
   wherein a hologram is arranged between the LED light source and the light input portion and that distributes according to a predefined pattern the light rays emitted by the LED light source and obtain a predefined luminance on both the central lighting portion and the peripheral lighting portion.

2. The lighting and/or signalling device as set forth in claim 1, wherein said hologram evenly distributes the light rays emitted by the LED light source and to obtain a uniform luminance on both the central lighting portion and the peripheral lighting portion.

3. The lighting and/or signalling device as set forth in claim 1 wherein said hologram allows direct transmission of a first portion of the light beams through the light guide by diverting said first portion of the light beams with an angle below the limit angle of the light guide material, and to send a second portion of the light beams in the light guide with an angle above the limit angle of the light guide material.

4. The lighting and/or signalling device as set forth in claim 3, wherein the first portion comprises 45%-55% of the light beams produced.

5. The lighting and/or signalling device as set forth in claim 3, wherein the hologram is configured so that the first portion of the deflected light beams are directly incident on said central lighting portion.

6. The lighting and/or signalling device as set forth in claim 3, wherein the hologram is configured so that said central lighting portion receives only the first portion of the deflected light beams.

7. The lighting and/or signalling device as set forth in claim 1, wherein the hologram has an axially symmetrical configuration.

8. The lighting and/or signalling device as set forth in claim 1, wherein the hologram is axially symmetrical with respect to a main axis aligned with respect to the main optical axis X-X of light emission of the LED light source.

9. The lighting and/or signalling device as set forth in claim 1, wherein the hologram is placed in contact with the light input portion of the light input and diffusion wall.

10. The lighting and/or signalling device as set forth in claim 1, wherein a pocket is provided on the light guide, on the side of the light input and diffusion wall which houses at least partially the LED light source.

11. The lighting and/or signalling device as set forth in claim 10, wherein the hologram is laminated on an inner surface of the pocket.

12. The lighting and/or signalling device as set forth in claim 1, wherein the device comprises at least one reflector element associated with the light input and diffusion wall of the light guide and directly facing the respective extraction elements so as to reflect the light towards the light output wall.

13. The lighting and/or signalling device as set forth in claim 12 wherein the reflector element comprises a plate facing the light input and diffusion wall, wherein said plate is perforated and delimits a seat housing the hologram.

14. The lighting and/or signalling device as set forth in claim 13, wherein said seat houses at least partially the LED light source.

15. The lighting and/or signalling device as set forth in claim 13, wherein said seat has a hollow shape facing towards the hologram.

16. The lighting and/or signalling device as set forth in claim 13, wherein said plate and/or said seat is coated with a film of reflective material.

17. The lighting and/or signalling device as set forth in claim 1,
   wherein a diffusion layer is arranged on the side of the light output wall, covering the lighting portion,
   wherein said diffusion layer has a transmittance differentiated according to the luminous intensity(luminance) of the incident light rays on the lighting portion, so as to obtain a uniform luminous intensity both on the central lighting portion and on the peripheral lighting portion.

18. The lighting and/or signalling device as set forth in claim 17, wherein the diffusion layer has a lower transmittance at the light rays with greater luminous intensity incident on the lighting portion and a greater transmittance at the light rays with lower luminous intensity incident on the lighting portion.

19. The lighting and/or signalling device as set forth in claim 17, wherein the diffusion layer has less transmittance at the central lighting portion and greater transmittance at the peripheral lighting portion.

20. The lighting and/or signalling device as set forth in claim 17, wherein the diffusion layer comprises an opaline layer and the transmittance variation is obtained by a variation of the thickness of the opaline layer with respect to a cross-section plane parallel to the main optical axis of the LED light source.

21. The lighting and/or signalling device as set forth in claim 17, wherein the diffusion layer comprises an embossed layer and the transmittance variation is obtained by a change in embossing density/roughness and/or thickness and/or roughness of the embossed layer, relative to a cross-section plane parallel to the main optical axis of the LED light source.

22. The lighting and/or signalling device as set forth in claim 17, wherein the diffusion layer comprises a screen-printed layer and the variation of transmittance is obtained by different patterns or motifs of said screen-printed layer.

23. The lighting and/or signalling device as set forth in claim 12, wherein the extraction elements are micro-optics that diffuse light towards the light output wall and/or towards the reflector element.

24. The lighting and/or signalling device as set forth in claim 23, wherein said micro-optics diffuse light towards the light output wall so as to obtain the same luminance between the central lighting portion and the peripheral light portion.

25. The lighting and/or signalling device as set forth in claim 1, wherein the extraction elements are arranged according to a non-homogeneous pattern having a density that increases as the distance from the corresponding LED light source increases in a radial direction contained in a plane perpendicular to the main optical axis and incident therewith.

26. The lighting and/or signalling device as set forth in claim 1, wherein the extraction elements are arranged according to a non-homogeneous scheme in which, as the distance from the corresponding LED light source increases in a radial direction, the depth of the extraction elements on the light input and diffusion wall also increases.

27. The lighting and/or signalling device as set forth in claim 12, wherein the reflector element is a white film or a mirror reflecting the light coming from the light input and diffusion wall of the light guide.

28. The lighting and/or signalling device as set forth in claim 1, wherein the extraction elements are arranged on the light input and diffusion wall of the light guide.

29. The lighting and/or signalling module comprising a plurality of lighting and/or signalling devices as set forth in claim 1, wherein lighting portions of adjacent devices are separated by barrier elements opaque to light.

30. The lighting and/or signalling module as set forth in claim 29, wherein reflector elements of the devices also act as barrier elements at adjacent lighting devices.

31. The lighting and/or signalling module as set forth in claim 29, wherein the barrier elements comprise a film and/or septums opaque to light.

* * * * *